United States Patent [19]

Ng et al.

[11] 4,374,381
[45] Feb. 15, 1983

[54] TOUCH TERMINAL WITH RELIABLE PAD SELECTION

[75] Inventors: Henry H. Ng, Chestnut Hill; Frederick R. Schmidt, Marshfield, both of Mass.

[73] Assignee: Interaction Systems, Inc., Newtonville, Mass.

[21] Appl. No.: 259,614

[22] Filed: May 1, 1981

Related U.S. Application Data

[63] Continuation-in-part of Ser. No. 170,056, Jul. 18, 1980.

[51] Int. Cl.³ .......................... G06F 3/14; G09F 9/32
[52] U.S. Cl. ................................... 340/711; 340/712; 340/365 C
[58] Field of Search ............ 340/365 C, 365 E, 365 S, 340/365 R, 712, 711, 365 UL, 802; 200/DIG. 1; 178/17 C

[56] References Cited

U.S. PATENT DOCUMENTS

| | | | |
|---|---|---|---|
| 3,696,409 | 10/1972 | Braaten | 340/365 C |
| 3,772,684 | 11/1973 | Scantlin | 340/365 E |
| 3,973,256 | 8/1976 | Stoesser et al. | 340/365 E |
| 4,145,748 | 3/1979 | Eichelberger et al. | 340/365 C |
| 4,157,539 | 6/1979 | Hunts et al. | 340/365 C |

FOREIGN PATENT DOCUMENTS

| | | | |
|---|---|---|---|
| 2034043 | 10/1978 | United Kingdom | 340/711 |
| 2011089 | 12/1978 | United Kingdom | 340/711 |

*Primary Examiner*—John W. Caldwell, Sr.
*Assistant Examiner*—Donnie L. Crosland
*Attorney, Agent, or Firm*—Lahive & Cockfield

[57] ABSTRACT

A touch terminal identifies a single user-selectable, touch-responsive pad element on the display screen for user communication with a data processing system. The terminal makes the identification in response to the durations of pulse signals which vary according to the touch-selection condition of the pad elements. A multiple-step technique of repetitively measuring the signal durations relative to reference values attains essentially error-free pad selection. The operation includes the updating of the reference values of the pulse-signal durations.

10 Claims, 7 Drawing Figures

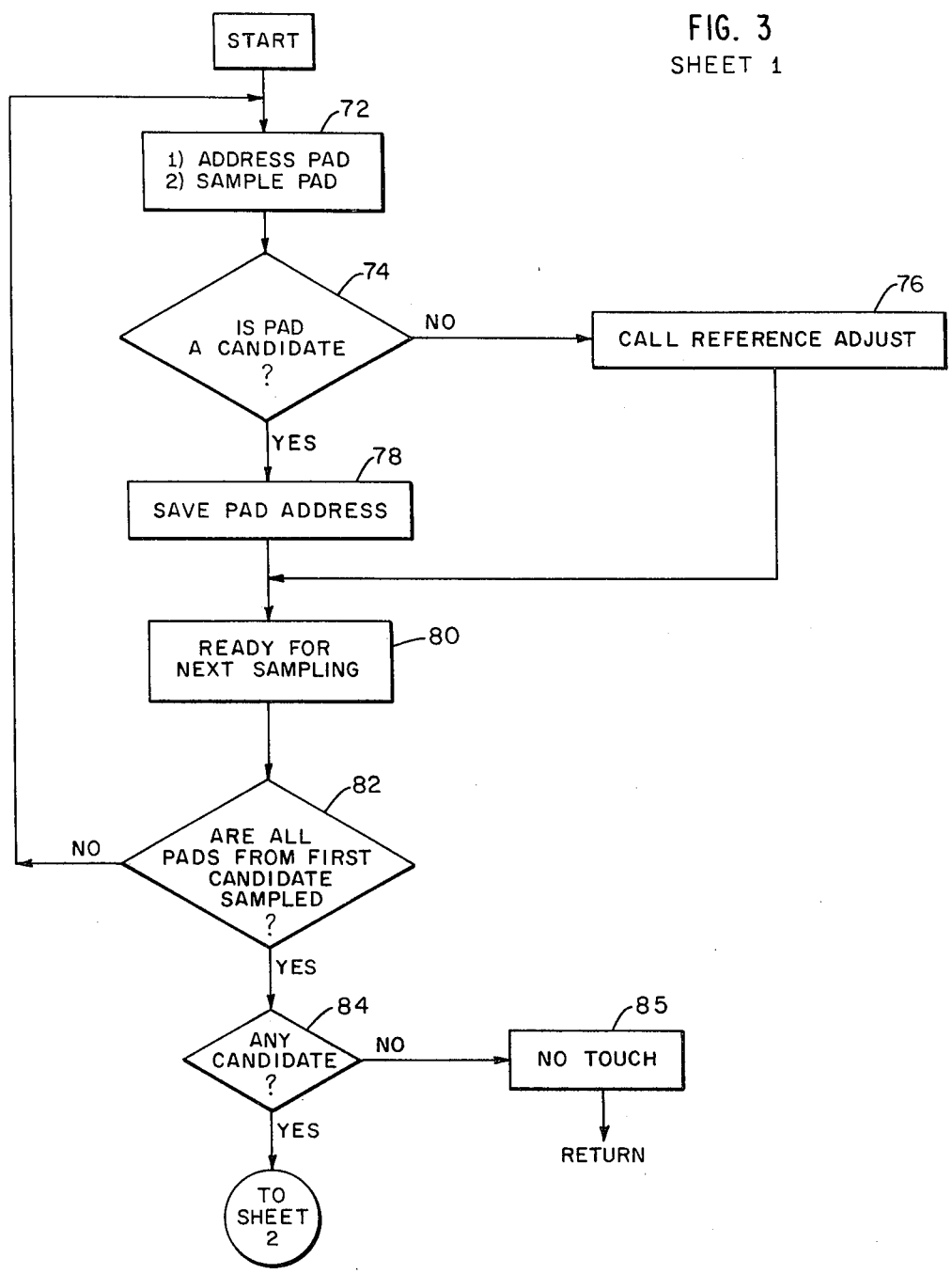

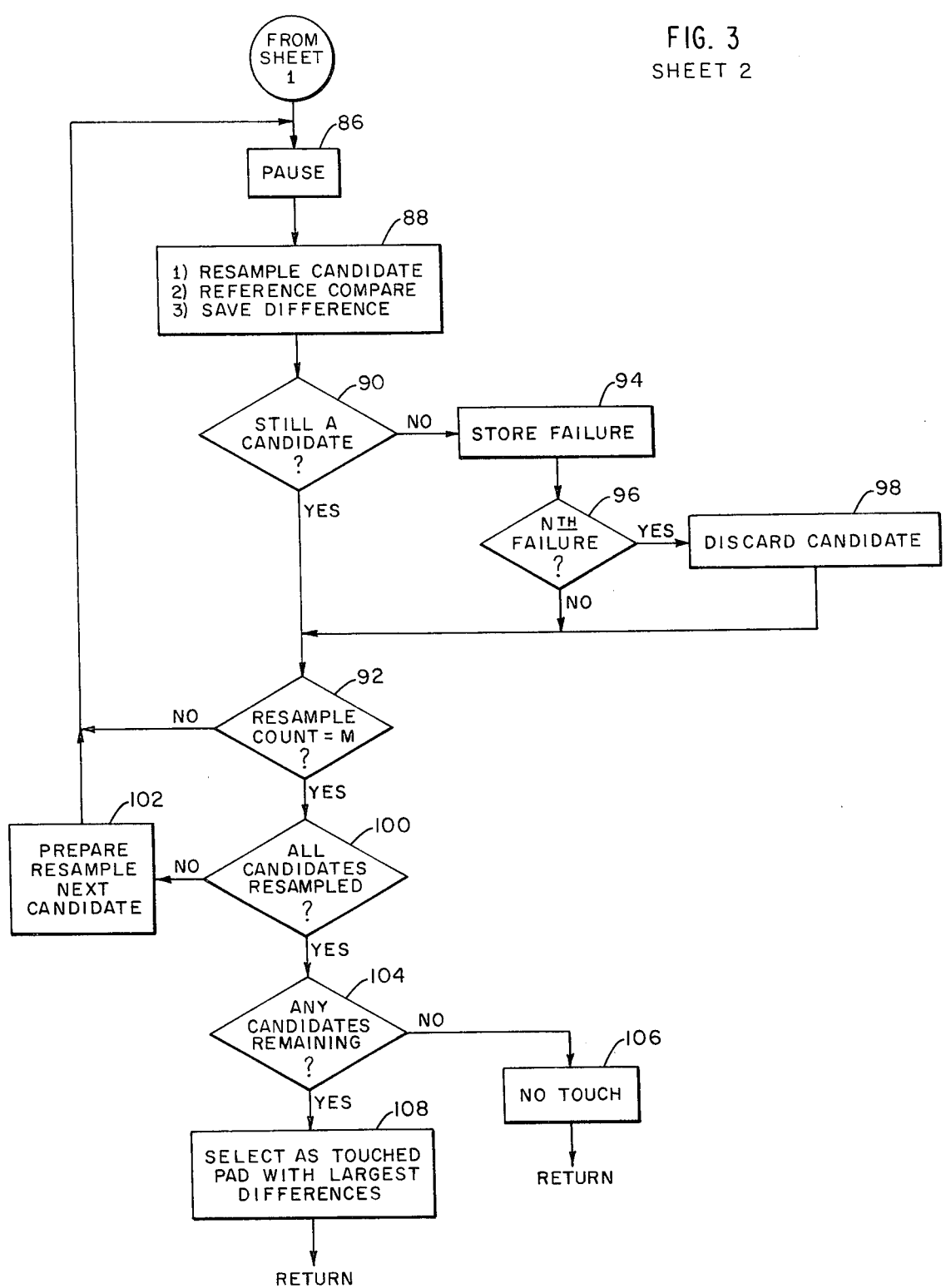

TOUCH TERMINAL WITH RELIABLE PAD SELECTION

BACKGROUND

This application is a continuation-in-part of the commonly assigned application Ser. No. 170,056, filed July 18, 1980.

This invention relates to a touch terminal, which is an information display device that receives information when the user touches any selected location on the display screen. The screen has a transparent contact or touch pad element at each designated location. When the data processing system with which the terminal is connected displays information for the user to select, the user instructs the system by placing a finger on the screen at the location where the desired information is being displayed. The touch terminal responds to the user touch by identifying which pad element is at the screen location which the user selected.

The invention provides improvements in the pad element selection. The improvements enhance the accuracy and the reliability of the terminal response to user selection of a pad element. More particularly, the invention provides for essentially error-free and unambiguous identification of a single user-selected pad element.

Touch terminals are known in the art, as disclosed for example in U.S. Pat. No. 3,696,409. That patent discloses a system that counts variable-frequency oscillations to identify that the user has touched a contact pad. A terminal of that type has been marketed by Information Dialogues Inc. More recently, the Wall Street Journal of May 19, 1980 reported on a so-called Proteus touch terminal developed by Solid State Technologies, Inc.

A touch terminal is advantageous because it enables a person with minimal training to use a data processing system. The system typically requests information from the user simply by displaying one or more questions and a set of available responses. The user responds by placing a finger on the display screen at the location of the desired or proper response. One illustrative application of a touch terminal is in a public library. A library patron can identify a book, together with its availability and location in the library collection, without recourse to a librarian or to the card catalog, simply by designating locations on the terminal screen. Each such user designation responds to one or more computer inquiries. In this way the user can instruct the computer to locate the book either by way of subject, by author, or by title, as the user elects. Among the companies marketing equipment of this type is C L Systems, Inc., of Newton, Mass.

Errors in the identification of which pad element a user selects can arise for several reasons. One occurs when the user's touch overlaps two pad elements. Another occurs when the user touches the screen momentarily, typically due to error, before touching a different screen location; or when the user inadvertently brushes by the display screen. Aside from such user errors, the equipment is subject to faulty operation. The pad elements form capacitors which, by virtue of the accessibility of the pad elements, are subject to change due to changes in temperature, humidity and line voltage, and even due to dirt on the display screen. These changes in the pad-configured capacitors can cause undesired changes in the circuits which they form.

It is accordingly an object of this invention to provide a display touch terminal which identifies with high reliability a single pad element as user selected.

Another object is to provide a display touch terminal which identifies a single pad element as user selected with secure protection against user error and against faulty equipment operation, including that due to environmental changes and power line fluctuation.

It is also an object that the terminal provide the foregoing features even when there is a relatively large number of pads. Many pads are desired in a touch terminal to make possible operation that presents a user with opportunity for a selection from among many possible responses simultaneously. This can result in both efficient system operation, and user convenience, in contrast to a terminal that is limited to only a few possible responses.

Further objects of the invention are to provide a display touch terminal having the foregoing features and yet which is easy for a user to use and which can be manufactured with presently available components at relatively low cost.

It is a further object of the invention to provide apparatus for adding touch capability, especially with the foregoing features, to an existing display terminal.

Other objects of the invention will in part be obvious and will in part appear hereinafter.

SUMMARY OF THE INVENTION

A touch terminal according to one preferred embodiment has oscillators connected in circuit with conductive transparent pads on the display screen for producing a sequence of pulse signals with durations responsive to the capacitive loading which a person applies to any pad. The oscillator and pad stage of the terminal thus produces a sequence of pulse signals with pulse-signal durations responsive to the touch-selection condition of any single addressed pad. A computer address element addresses the pads one by one. The pulse-signal durations developed from each addressed pad element are measured a multiple number of times, and a single measure is derived which is compared with a reference value for that pad element. A memory element stores information identifying the reference duration for each pad.

The measuring element employs a counter for measuring the pulse durations. In one embodiment a comparison element selects from among multiple duration measures the ones having the largest values, and an average of the selected, extreme-valued measures is compared with the reference measure. In another embodiment, a simple average of multiple measured pulse durations is compared with the reference. A comparison which exceeds the reference value, which typically includes a threshold factor, is sensed as identifying the addressed pad as possibly being touched by the user, i.e. as a candidate for the final selection. A memory stores the identification of each pad that is sensed as being a candidate.

The system performs this sequence of operations for each pad on the display screen. Where the multiple duration-measuring and reference-comparing operation identifies one or more candidates, the system performs a second set of sampling operations to measure again the pulse-signal durations for each candidate pad relative to the corresponding reference value. This operation involves a new sequence of multiple, repetitive measuring steps. When no candidate pad produces a specified reference-exceeding duration measure on this second set of sampling operations, the system concludes that no pad is being touched. This is also the result of a first sampling that finds no candidates. On the other hand, the system identifies as touched the one pad which produces a duration measure which exceeds the corresponding reference value by more than any other candidate.

The foregoing dual duration-sampling operation has been found to attain the identification of a single pad as being selected by the user with a high degree of accuracy, in spite of various user-originated conditions which otherwise can introduce identification errors.

In further accord with the invention, where the multiple duration-measures and reference-comparisons for any addressed pad yield a result that does not exceed the reference value, the touch terminal has provision to replace the existing reference values with a new one based on the newly measured duration. This updating of each reference value provides the touch terminal with a continuous reference adjustment that takes into account equipment-artifacts such as changes in environmental temperature and humidity, as well as line voltage fluctuations and dirt on the display screen. Moreover, in a preferred embodiment, the existing reference value is updated in this manner only when the system determines that no pad element is being touched. This safeguard ensures the veracity of each updated reference value.

A display touch terminal having these features can identify a single pad element, out of a relatively large set, typically of thirty-two pads, as touch selected with high accuracy in terms both of user factors and of equipment factors, including environmental conditions which can impact equipment operation. The terminal moreover performs the multiple duration-measuring and reference-comparing operations, and the reference-updating operations, essentially without user awareness and hence without distracting the user.

These features make a touch terminal embodying the invention highly suited for a variety of applications, particularly where persons unskilled with data processing techniques can benefit from the use. This includes library use as previously described, as well as placing catalog orders, selecting available travel facilities and booking reservations, and any number of other directory and like search and lookup applications.

The invention accordingly comprises apparatus embodying features of construction, combinations of elements, and arrangements of parts adapted to practice the foregoing features, all as exemplified in the following detailed disclosure, and the scope of the invention is indicated in the claims.

BRIEF DESCRIPTION OF THE DRAWINGS

For a fuller understanding of the nature and objects of the invention, reference should be made to the following detailed description and the accompanying drawings, in which:

FIG. 3 is a flow chart of pad selection operation in accordance with the invention;

DESCRIPTION OF ILLUSTRATED EMBODIMENTS

Figure 1:
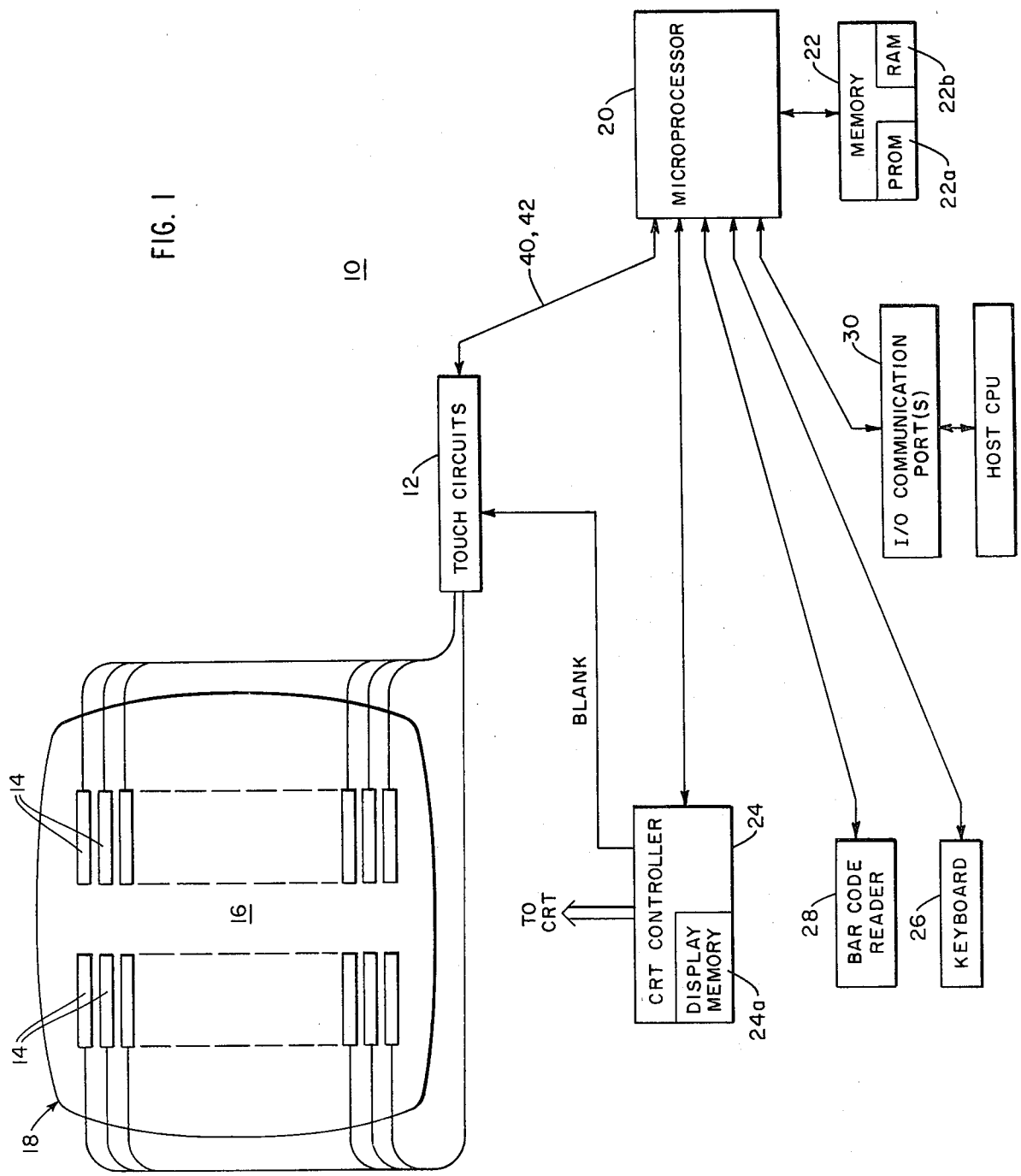
FIG. 1 is a block schematic representation of a cathode ray tube touch terminal according to the invention.

A cathode ray tube terminal 10 according to the invention and shown in FIG. 1 has a construction known for a conventional CRT terminal with the addition of a touch circuit 12 and an array of transparent and conductive capacitance-forming touch pads 14. The pads are on a screen 16 which overlies the face of the cathode ray tube (CRT) 18 of the terminal. The illustrated terminal employs a conventional arrangement of a microprocessor 20 connected with a memory element, which typically includes both a programmable read-only memory (PROM) 22a and a random access memory (RAM) 22b. The microprocessor provides a desired display on the cathode ray tube 18 by way of a CRT controller 24 which includes a display memory 24a. Also connected with the microprocessor are a keyboard 26, a bar code reader 28, and I/O communication ports 30 for coupling information between the microprocessor 20 and other equipment, typically including a host central processing unit.

The terminal 10 displays information on the cathode ray tube 18 largely in a conventional manner in response to instructions and data received from the keyboard 26, from the bar code reader 28, from other equipment via the communication port 30, and from the memory 22. When the system with which the terminal is connected needs instructions from the user, it is programmed to display one or more questions together with available responses to each question.

The user provides the needed instructions by placing a finger on the screen at the location which overlies the response that meets the user's needs. For example, in an application in a public library, the system may inquire, by presenting an appropriate display on the terminal CRT 18, whether the user wants to select a book by author, by title, or by subject. The user touches the display screen at the location where the reply, i.e. author, title or subject, which the user has in mind is displayed. The terminal identifies the touched location by determining which pad 14 is located there.

Successful communication between the user and the terminal is clearly important. Problems such as delays and incorrect terminal interpretation of user selections will quickly discourage the user. The touch circuit 12 provides highly reliable communication in a manner which the user typically is totally unaware of, as now described with reference to FIG. 2.

Figure 2:
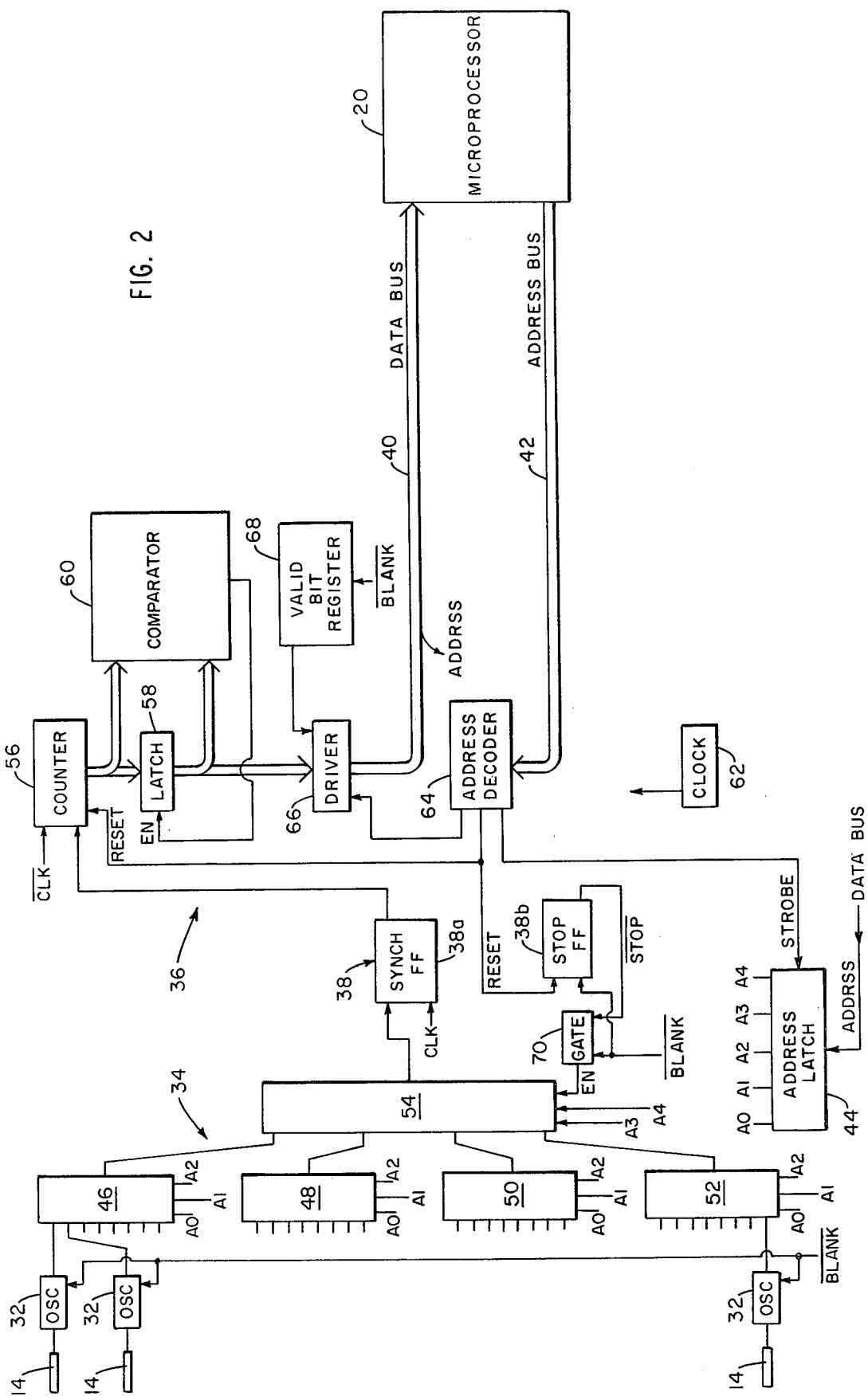
FIG. 2 is a functional block diagram of touch logic circuits for the terminal of FIG. 1.

The illustrated touch circuit 12 in FIG. 2 includes the set of touch pads 14, at the left of the drawing, connected with a stage of oscillators 32. The illustrated terminal has thirty-two separate touch pads 14, each connected with a separate oscillator 32 in a manner such that user contact with the screen 16 at a pad 14 changes the duration of the pulse signals which the oscillator 32 connected therewith produces. The effect of a person touching a pad 14 typically is to increase the duration of each pulse signal to one-and-one-half times the signal duration in the absence of such user contact or like capacitive loading.

A selection stage 34 applies the signals from one oscillator to a measuring stage 36 by way of a synchronizing stage 38. The selection stage operates in response to address signals it receives from the microprocessor 20 by way of a data bus 40. The touch circuit is also connected with the microprocessor 20 by way of an address bus 42. An address latch 44 in the selection stage 34 stores the address signals, and applies a five bit address to an array of four first-stage selectors 46, 48, 50 and 52 and to a second-stage selector 54. Each first stage selector receives three bits of the address from the latch 44 and in response couples one of the eight oscillators to which it is connected to a single output from that first-stage selector. The second-stage selector 54 responds to two bits of the address from the latch and applies the output from one of the four first-stage selectors to the synchronizing stage 38.

The synchronizing stage constrains the measurement of pulse signals to start with the first full clock pulse in a horizontal sweep interval of the cathode ray tube. As conventional, the CRT controller 24 of FIG. 1, together with the microprocessor 20, controls the horizontal sweep and horizontal blanking operation of the cathode ray tube 18. The illustrated CRT controller 24 (FIG. 1) applies a blanking control signal, developed in this operation, to the touch circuit 12. Other portions of the FIG. 2 circuit inhibit the measurement of pulse signals during each horizontal blanking interval of the CRT. The synchronizing stage 38, which employs two single flip flops, 38a and 38b, times each duration measurement in a horizontal sweep interval to coincide with one or more full successive clock pulses. For this purpose, the synchronizing flip flop 38a is set in response to the leading edge of a clock pulse when it receives an oscillator pulse signal, and is cleared in response to the leading edge of the first clock pulse after termination of that pulse signal.

The measuring stage 36 measures the durations of pulse signals from the single oscillator 32 connected with an addressed pad 14. In a preferred embodiment the stage measures duration more than once and selects the longest measure, which is the one manifesting the greatest effect of user contact or touch with the addressed pad. To effect this operation, the illustrated stage 36 employs a counter 56, a latch element 58, and a comparator 60, and operates together with a clock 62.

The counter 56 counts timing pulses from the clock 62 for the duration of a single pulse signal from the addressed oscillator 32. After an initial counting step, the count in the counter 56 is transferred to the latch element 58 and the counter is cleared to prepare it for a second counting step. After the second and each subsequent counting step, the comparator 60 transfers the counter contents to the latch element only when the number in the counter exceeds the number in the latch element. The counter 56 is cleared, however, prior to each counting step. In this way, the number in the latch element 58 is the extreme value of the oscillator pulse-signal durations measured in several successive counting steps. In the illustrated embodiment, these measures are made during a single horizontal sweep of the cathode ray tube. The microprocessor 20 reads the extreme-valued number stored in the latch element 58, via the data bus 40.

In a preferred operating sequence, the microprocessor addresses a single pad 14 throughout several horizontal sweep intervals of the CRT. The measuring stage 36 produces a new duration measure in the latch element 58 during each sweep interval, and the microprocessor 20 averages the several duration measures. The average value is compared with previously-stored information identifying a reference value of the pulse duration for the addressed pad 14. These pad-sampling steps and the further operating sequence for determining that a single touch pad 14 has been touched, i.e. selected by a user, are described hereinafter.

With further reference to FIG. 2, the illustrated touch circuit also has an address decoder 64, connected with the address bus 42, which selects one of three functions in the touch circuit according to the address signals it receives. One function is to actuate the address latch 44 to read in an address signal from the microprocessor. As previously described, this address signal identifies the single pad 14 which is to be sampled in the manner just described with reference to the measuring stage 36. A second function of the address decoder 64 is to reset the counter 56, and a third function is to actuate a driver 66 to apply to the data bus 40, for transmission to the microprocessor 20, the number stored in the latch element 58.

The illustrated synchronization of the FIG. 2 touch circuit with the horizontal sweep of the cathode ray tube is applied at several levels. One is that the low-level blanking control signal (designated $\overline{BLANK}$), which the FIG. 1 CRT controller 24 produces at all times except during horizontal sweep, when it produces a high-level BLANK signal, disables the oscillators 32. The low-level blanking control signal also disables the selection stage 34. More particularly a gate 70 disables the second-level selector 54 when either the low-level $\overline{BLANK}$ signal or a $\overline{STOP}$ signal applied to it are present. Further, the leading edge of the $\overline{BLANK}$ signal sets a valid bit register 68 for synchronizing the transfer of the latch element 58 contents to the microprocessor by way of the driver 66.

A stop flip flop 38b in the synch stage 38 is set by the reset signal from the address decoder 64 and is cleared by the low-level $\overline{BLANK}$ signal. The flip flop produces the $\overline{STOP}$ signal, which disables the selector stage 34, when set. The address decoder produces the reset signal in response to a microprocessor control signal produced when the contents of the latch element 58 are read out to the data bus.

The operating sequence of the touch terminal 10 of FIG. 1 with the touch circuit of FIG. 2 commences with an initialize cycle that develops a reference value for the signal duration from each oscillator 32. The reference value identifies the signal duration when the pad 14 connected with that oscillator is not touched. It preferably is produced when no pad on the screen 16 is touched, to exclude any touch-responsive artifacts. The initialize cycle involves addressing each touch pad 14, one at a time, and storing a measure of signal duration produced with each addressed pad. During the addressing of each pad 14, the measuring stage 36 performs several measures of pulse-signal duration and stores the extreme value in the latch element 58. This preferably is repeated several times, with the microprocessor reading in each extreme value and deriving a single measure that is the average of the several measured extreme values. The microprocessor adds a threshold quantity to this average, and stores the resultant in the memory 22, particularly in the random access memory 22b, to serve as a reference value for the addressed pad element. A complete initialize cycle of this nature, during which the microprocessor develops and stores a reference pulse duration for each pad element, requires less than five seconds. The terminal screen 16 remains untouched during this time.

The flow chart of FIG. 3 shows a preferred touch detecting routine for the touch terminal 10 of FIGS. 1 and 2, after it is initialized. The routine starts with the loading of a pad address into the FIG. 2 latch 44, as designated with action box 72. The measuring stage is then operated to sample the pulse duration from that pad several times. The illustrated sample operation counts clock 62 pulses with the counter 56 for each of one or more oscillator pulse signals during a single horizontal sweep time of the CRT. The latch element 58 and the comparator 60 selects the extreme-valued measure, which is transferred to the microprocessor. The microprocessor repeats this sub-set of steps several times, eight in one embodiment, and computes and saves the average of the several values. This completes a sample pad operation as designated in action box 72.

The next step in the routine is, as designated with decision box 74, to determine whether the average duration measure is larger than the reference value, including any threshold, being stored for the addressed pad. If the decision is negative, the routine calls a reference adjust routine as designated with action box 76. If the decision is affirmative, the microprocessor stores or saves the identification of the addressed pad as a candidate for the pad which the user has selected, action box 78. After this step and after the calling of the reference adjust routine, the routine proceeds to action box 80. This action readies the touch circuit of FIG. 2 for another sample step. It includes resetting the counter 56 and the stop flip flop 38b, and perhaps other elements, depending on the logic circuit detail, and incrementing the microprocessor counter that is keeping track of the system operation.

The illustrated routine proceeds with a decision, indicated with decision box 82, to determine whether all the pads have been measured in the foregoing manner, starting from the first pad element designated as a candidate. That is, if the seventeenth pad out of thirty-two is the first one designated as a candidate after starting with the first one, the routine produces a negative report from decision box 82 until it has sampled all thirty-one other pads, i.e. pads numbered eighteen to thirty-one and pads numbered zero to sixteen. The negative report from decision box 82 returns the sequence to action box 72 for the sampling of the next pad. The illustrated routine continues in this manner to measure an average of several extreme pulse durations for each pad 14 until all have been sampled, so that decision box 82 produces an affirmative result. The routine then progresses to decision box 84 with a determination of whether any candidates have been detected. If not, the routine reports that no pad is touched, action box 85, and advances directly to the end of the FIG. 3 flow chart, i.e. to the return point. When at least one candidate has been detected, the routine proceeds to action box 86, which is to pause for a selected brief time. The reason for this pause, which may be considered optional, is to prevent the entire routine in FIG. 3 flow chart from being completed in such a fast time that the system responds to an accidental contact or to a momentary erroneous touching of the cathode ray tube screen. In one illustrative embodiment of the invention, the pause is sixteen milliseconds.

After this pause, the routine proceeds to action box 88, which calls for a remeasuring of all candidates, i.e. of all pads which produced an affirmative result from decision box 74. The re-sampling is performed by addressing each candidate one-by-one from the candidate addresses saved per action box 78 and re-measuring the extreme duration of the oscillator pulse-signal durations for each of a number of horizontal sweep times and transferring each re-measured extreme duration to memory, all in the same manner as described with reference to action box 72. Further, the average of the re-measured extreme durations is compared with the reference value for that pad element, and the difference between the re-measured average and the reference is saved. Assuming that the re-measured average exceeds the reference value, the routine continues to identify the addressed pad as a candidate and produces an affirmative report from decision box 90. The program then proceeds to decision box 92, which determines whether the addressed candidate has been re-sampled a prescribed number (m) of times. If not, the operation returns to action box 86 and, after the pause, again performs the steps of action box 88. In one embodiment of the invention, (m) is fifteen, i.e. the system re-tests each candidate pad with a full sample and reference comparison sequence per action box 88 fifteen times. In the event the reference comparing step of action box 88 produces a difference which indicates that the re-measured average does not exceed the reference value, the routine stores the fact of this failure, action box 94. The routine next tests, per decision box 96, whether the number of recorded failures for the addressed candidate equals a preselected number, (n). This operation saves the system from discarding a candidate on the basis of an irregular failure. By way of example, in the embodiment described where each pad sampling sequence produces an average of eight extreme duration values and each candidate is re-sampled fifteen times, i.e. (m=15), (n) is three. Where the decision from box 96 is affirmative, the action is to discard or drop the candidate, box 98, and proceed to action box 92. An negative decision from box 96, on the other hand, returns the operation directly to decision box 92, as FIG. 3 shows.

When a candidate has been fully tested by repeated re-sampling in this manner, and the action of decision box 92 produces an affirmative decision, the routine tests whether all the candidates have been tested, per decision box 100. If not, the program prepares to re-test the next candidate, action box 102, and returns to execute the actions of boxes 86 and 88. On the other hand, when all candidates have been re-tested, the program tests whether any candidate remains qualified, decision box 104. If not, the routine determines no pad is touched, action box 106, and returns.

In the event a candidate remains after decision box 104, the routine proceeds to action box 108. This is the final step and calls for the terminal to designate it is being touched by the user. The program identifies the touched pad as the single pad 14 which yielded the largest difference over its corresponding reference value as determined with the multiple, i.e. (m), re-samplings in accordance with action box 88. One embodiment of the foregoing operation identifies a pad as touched when the user touches it for at least roughly a quarter of a second. The illustrated routine is now complete and the touch terminal is ready to return and either re-execute the routine or execute a further routine depending on action of the microprocessor 20.

Figure 4:
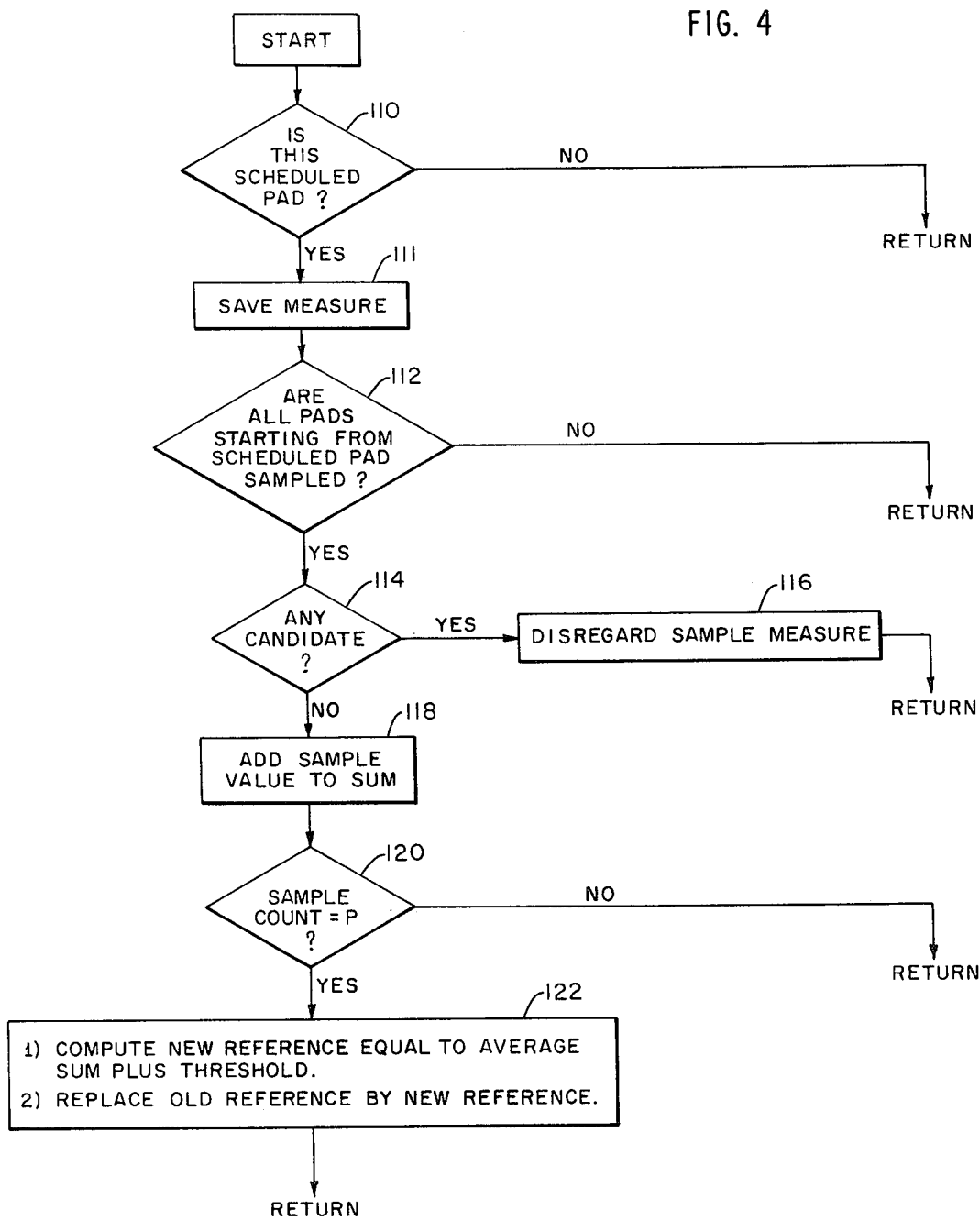
FIG. 4 is a flow chart of reference-value updating operation embodying further features of the invention.

FIG. 4 is a flow chart of the reference adjust routine which the routine of FIG. 3 calls when the system produces a measurement of signal duration equal to or less than the reference value for the addressed pad, i.e. in response to a negative determination from FIG. 3 decision box 74. The function of the reference adjust routine is to change the stored reference values essentially continuously, provided certain conditions are present. In the illustrated reference adjust routine, the microprocessor 20 schedules the adjusting of the reference values so that all are examined one at a time, in order. Hence at any time, the reference value for a specified pad is scheduled for adjustment. The first step in the routine is to verify, as indicated with decision box 110, that the pad and oscillator which produced the measure of pad duration that called up the routine are the ones which the microprocessor 20 is scheduled to update. A negative decision advances the routine of FIG. 4 to the return point which, as indicated in the flow chart of FIG. 3, returns the operation of the touch terminal to prepare for the sampling of the next pad. An affirmative decision however advances the routine to action box 111, which calls for the microprocessor to store the measured duration value.

The next step of the FIG. 4 routine is, as decision box 112 indicates, to determine whether all the pads on the CRT screen 16 have been sampled. If not, the routine again returns to the FIG. 3 routine. The reason is that, according to the illustrated preferred embodiment, no reference values are updated unless the entire field or set of pads 14 has been sampled and the system determines that none is being touched. Hence the illustrated embodiment does not adjust a reference value unless all pads have been sampled per decision box 112 and none is designated as a candidate, as determined next with decision box 114. As shown, an affirmative decision at this juncture causes the routine to disregard the sample measure, action box 116, and return. On the other hand, when all pads have been sampled, i.e. an affirmative decision from box 112 and there is no candidate, i.e. a negative decision from box 114, the operation proceeds to action box 118. This step calls for an operation termed add sample value to sum. The illustrated touch terminal performs this operation by adding the signal duration just measured, and saved per action box 111, to the contents of a data store in the memory 22 or provided by a register in the microprocessor 20. This data store is cleared each time the microprocessor addresses a different touch pad, e.g. at the same time it actuates the FIG. 2 divider 64 to load a new address into the latch 44.

The routine in FIG. 4 does not change a reference value in response to a single measurement, but only in response to a number, (p), of such measurements. Accordingly, the illustrated routine next determines whether that number of pad-sampling operations has been performed. This is indicated with decision box 120. If the sample count is less than (p) so that the decision is negative, the routine advances to the return point and resumes operating according to the flow chart of FIG. 3.

Thus, reviewing the operations of the FIG. 4 routine as described so far, when the duration measurement made upon sampling an addressed pad yields a pulse duration that does not exceed the reference value for that pad, the FIG. 3 routine calls up the FIG. 4 routine. The latter routine first verifies that the system is examining the pad which is scheduled for reference adjustment. It next determines whether all pads starting with the scheduled one have been sampled without identifying any as candidates for being touched, with the decisions set forth in boxes 112 and 114. If either the former decision produces a negative result or the latter an affirmative result, the operation returns to the FIG. 3 flow chart.

After the system has sampled all pads, starting from the scheduled pad and looping through the entire set of pads, without identifying any candidates, and returned to sample again the scheduled pad, the FIG. 4 routine proceeds through decision boxes 112 and 114 to action box 118. As described, this step in effect stores the value just measured for the scheduled pad in the sum store and proceeds to decision box 120. Assuming the sample count is one, i.e. the terminal is in the process of the first sampling after attaining a negative decision with decision box 114, the decision determined with decision box 120 is negative and the system returns to the FIG. 3 routine. Under these conditions, the terminal will again sample the signal duration with the same pad address, i.e. with the pad scheduled for reference adjustment. When that pad again produces a negative report from the FIG. 3 decision box 74, the operation transfers to the FIG. 4 flow chart and again proceeds through the action and decision boxes 110, 111, 112, 114, 116, 118 and 120. In each such operating sequence, the step of decision box 118 adds the newly measured signal duration to the number in the sum store. This sequence of operations repeats, with the same pad address, until the terminal has determined by (p) successive iterations that the pad being addressed is producing a non-candidate measure. At this juncture the FIG. 4 routine attains an affirmative decision from box 120 and proceeds to action box 122. The first action taken there is to use the average of the (P) samplings to determine a new refernece value for this pad. As indicated, the new reference value is determined as the average of the sum of the (p) successive measures of signal duration now contained in the sum store. The threshold quantity is added to this average. The new reference value computed in this manner is placed in the memory 22 location corresponding to the addressed pad in place of the reference value previously stored there. The illustrated routine is now complete, and returns to the FIG. 3 routine with the operation set forth in action box 80.

A touch terminal according to this embodiment of the invention thus repeatedly measures the electrical capacitance of each touch pad and compares the measurement with a reference value before either adjusting the reference value or determining that any pad is being touched. Each pad is measured during each of several horizontal sweep intervals. Preferably during each horizontal sweep interval several measurements are made and an extreme value which is the furthest removed from the reference value is saved. Further the several sweep intervals preferably are successive intervals. The plural extreme values saved during several horizontal sweep intervals are then averaged to yield a single sampled measurement. That measure of signal duration is compared with the previously-determined reference measure specific for the addressed touch pad. At this juncture the touch terminal merely determines whether the addressed touch pad is a candidate for determination as being touched. The terminal accordingly increments to sample the next pad after having stored the identification of the pad just measured only when that pad has been determined to be a candidate.

The touch terminal proceeds in this manner to sample the capacitance at each touch pad, commencing with the first one if any, which is identified as a candidate. It stores the identification of that pad and of all other candidates. When the operation proceeds to return to the first candidate, the touch terminal resamples the capacitance associated with that touch pad and with each other pad which has been identified as a candidate.

Upon re-sampling the candidates, it is preferable to follow the same technique of multiple measurements both during each horizontal sweep interval and with several preferably successive sweep intervals. The difference between each average of the several extreme measures determined in this manner and the corresponding reference value is saved, together with the pad identification. When a candidate fails to produce a measure, e.g. an average of several extreme measures, which exceeds the reference value for a selected number of times, that candidate is dropped from the list of candidates. This operation, of re-sampling each candidate with multiple measurements, is repeated a multiple of times. At any time that no candidate remains, the operation ends and the terminal is ready to commence a new cycle or perform another operation. When only a single candidate remains, it is designated as the one being touched by the user. In the event that several touch pads remain as candidates after the foregoing multiple re-measurement operation, the terminal selects as the touched pad element the one which has produced a set of measures which exceeds the corresponding reference value by the largest margin.

As also described, the terminal examines any measure which does not indicate that the addressed touch pad is a candidate, or alternatively which is below that level by a selected margin, to determine whether that touch pad should be examined further to produce a new, corrected reference value. With the preferred operating sequence, the reference for any touch pad is adjusted in this manner only in the event that no touch pad is identified as being a candidate. Further, the new reference value is produced in response to multiple measurements, again to ensure accuracy and reliability.

Figure 5:
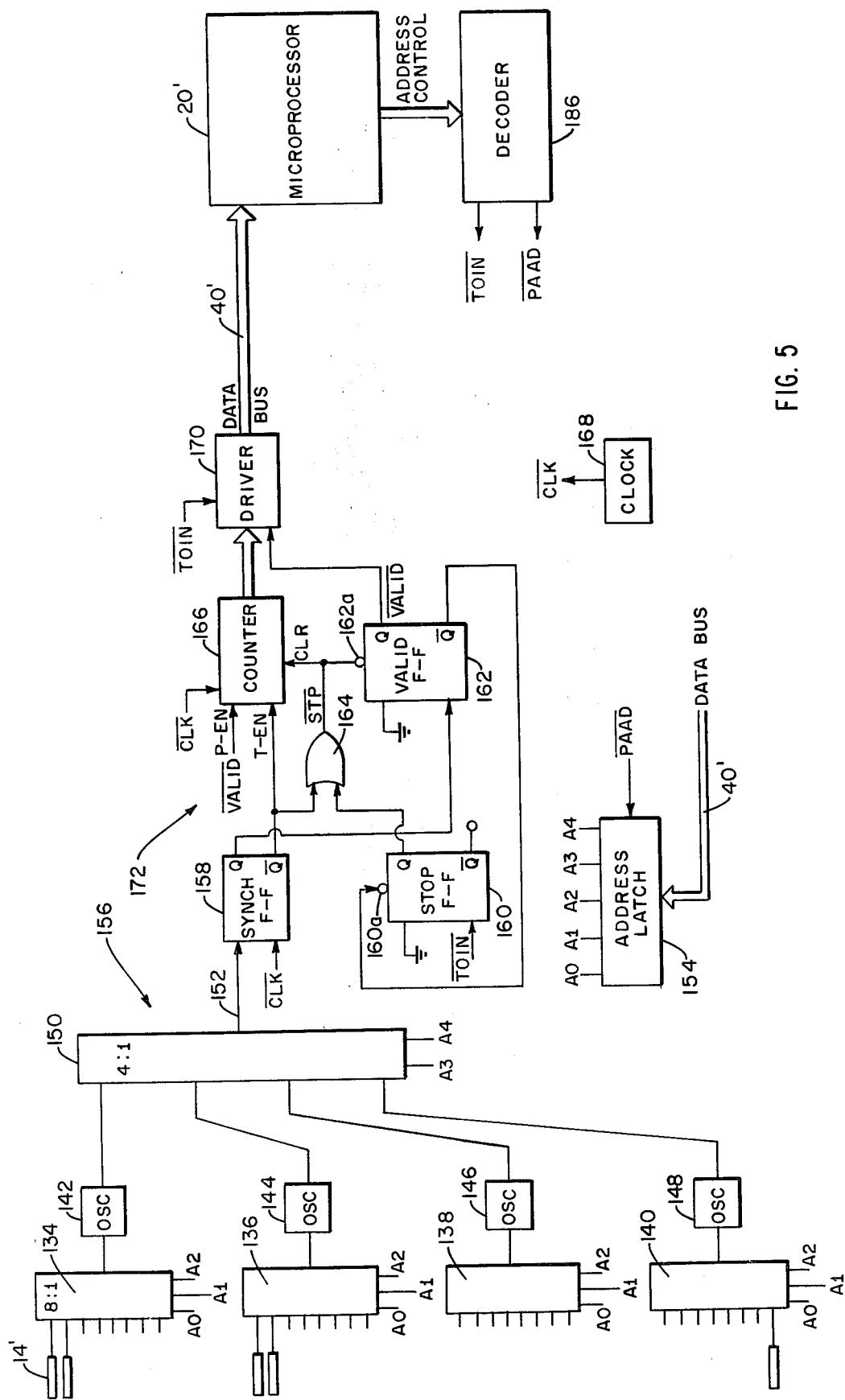
FIG. 5 is a block schematic diagram of another arrangement of touch circuits according to the invention.
Figure 6:
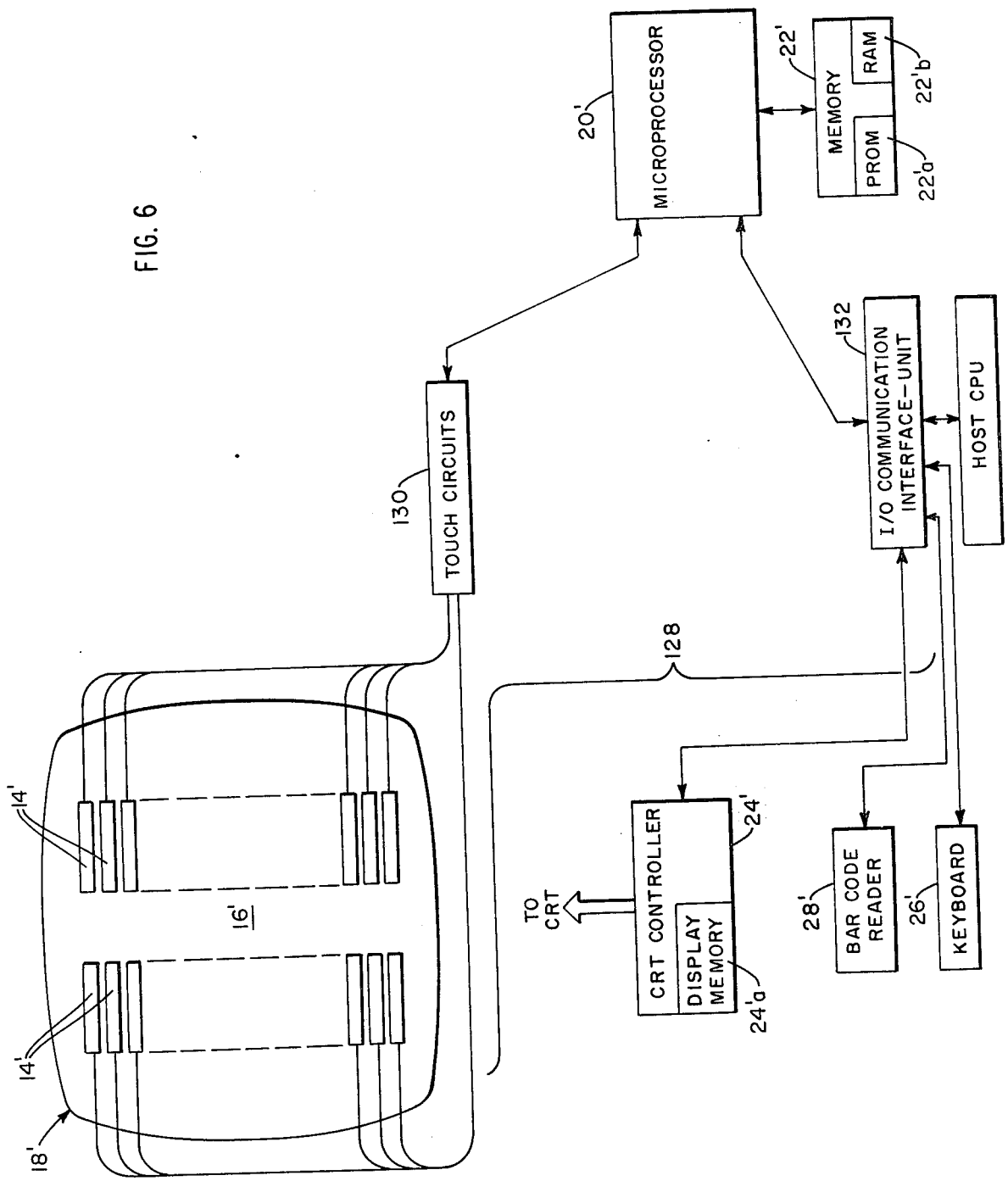
FIG. 6 is a block diagram similar to FIG. 1 and showing another configuration particularly suited for use with the touch circuits of FIG. 5.

FIG. 5 shows another embodiment of touch circuits according to the invention which employs fewer components than the touch circuits 12 of FIGS. 1 and 2. This embodiment can be used in the system of FIG. 1, but is described with particular reference to a kit that adds touch-sensitive human interaction to an existing cathode ray tube (CRT) terminal in a data processing system. Such a kit 128 provides, with reference to FIG. 6, the transparent screen 16' carrying touch pads 14', touch circuits 130, and a microprocessor 20' with a memory element 22' and with an I/O communication interface unit 132. (Elements of FIG. 6 similar to those in FIG. 1 bear the same reference numeral followed by a superscript prime.) The interface unit provides communication between the touch kit 128 and a host central processing unit (CPU), as well as with other input/output elements such as a keyboard 26', a bar code reader 28', and a display terminal having a controller 24' and a cathode ray tube 18'. Thus all connections of the touch kit 128 to the display terminal, to I/O elements, and to a host CPU can be by way of the interface unit 132, as FIG. 6 shows. This unit can employ standard data processing interface practices so that the touch kit requires minimal, if any, special connections in the equipment to which it is added. Further, the touch circuits 130 operate asynchronously from the cathode ray tube 18', including from the horizontal sweep circuit of the controller 24'.

The illustrated touch circuits 130 of the add-on kit 128 of FIG. 6 operate with the same set of thirty-two pads 14' previously described. The touch circuits 130 accordingly employ, as FIG. 5 shows, four analog multiplexes 134, 136, 138 and 140 to couple a single addressed pad 14' to the frequency controlling circuit of one of four oscillators 142, 144, 146 and 148. Each analog multiplexer responds to a three-digit binary address signal, designated A0, A1, A2, to connect the touch pad 14' connected to one of the eight input terminals thereof to the single output terminal, which as shown is connected to the frequency-controlling stage of one oscillator 142, 144, 146, 148. The output signal from each of the four oscillators is applied to a separate input of a further multiplexer 150 that responds to a two-digit binary address signal, designated A3, A4, to apply the output waveform from one selected, i.e. addressed, oscillator to the multiplexer output lead 152. Note that each analog multiplexer 134, 136, 138 and 140 can couple any addressed one of eight pads 14' to operate with a single oscillator 142, 144, 146 and 148. The touch circuits of FIG. 5 consequently employs only the four oscillators, not thirty-two as in FIG. 2, to operate with the thirty-two touch pads. The second-level multiplexer 150 can either be a like analog multiplexer, or a digital selector.

An address latch 154 develops the five binary address signals A0, A1 . . . A4 in response to address information it receives from the microprocessor 20' by way of the data bus 40'. A control signal designated $\overline{\text{PAAD}}$ from the microprocessor loads new address information from the data bus into the latch for continuous application to the multiplexers 134, 136, 138, 140 and 150.

The oscillators, touch pads, and multiplexers thus form a pad-selecting stage 156 which develops, on the output lead 152, an oscillator signal with a period responsive to the capacitance—and hence to the touch condition—of the one pad 14' addressed by address information which the microprocessor loaded into the address latch.

With further reference to FIG. 5, three flip-flops 158, 160 and 162, an OR gate 164, a counter 166, an asynchronous clock 168, and a driver 170 form a measuring stage 172 which produces a multiple-bit, parallel pulse-measuring signal which measures the length of an oscillator pulse from the pad-selecting stage 156. This measuring stage 172 of the touch circuits develops a pulse-measuring count asynchronously of the microprocessor 20', and applies the measure to the microprocessor in synchronism with the microprocessor operation.

The stage 172 of FIG. 5 is described with reference to the timing diagram of FIG. 7. Waveform 174 illustrates, at a time T1, the $\overline{\text{PAAD}}$ signal which the microprocessor 20' produces to load a new pad address into the address latch 154. The oscillator signal from the pad-selecting stage 156 and responsive to the touch condition at the addressed pad is applied to the data input of a synch flip-flop 158. This signal is a square-wave similar to the waveform 176 of FIG. 7. The complemented clock signal, designated $\overline{\text{CLK}}$, clocks the flip-flop 158 to the clear state during the low level period of the oscillator pulse. Waveform 176 in FIG. 7, which shows the signal level at the Q output of the sync flip-flop 158, shows this transition at the time T2. The signal level at the Q output of flip-flop 158 accordingly corresponds to the oscillator pulse signal on the stage 156 output lead 152 as clocked by the clock 168, and the FIG. 7 waveform 176 is labelled accordingly. When the level at the Q output drops low at time T2, the complementary level at the $\overline{Q}$ output switches high and enables the T-EN input of a synchronous counter 166. A valid flip-flop 162 was previously set and the $\overline{VALID}$ signal at its Q output (waveform 178) is at a high level and accordingly enables the P-EN input of the counter 166. With both enable inputs assertive, the counter commences counting clock pulses, $\overline{CLK}$, at the time T2.

Figure 7:
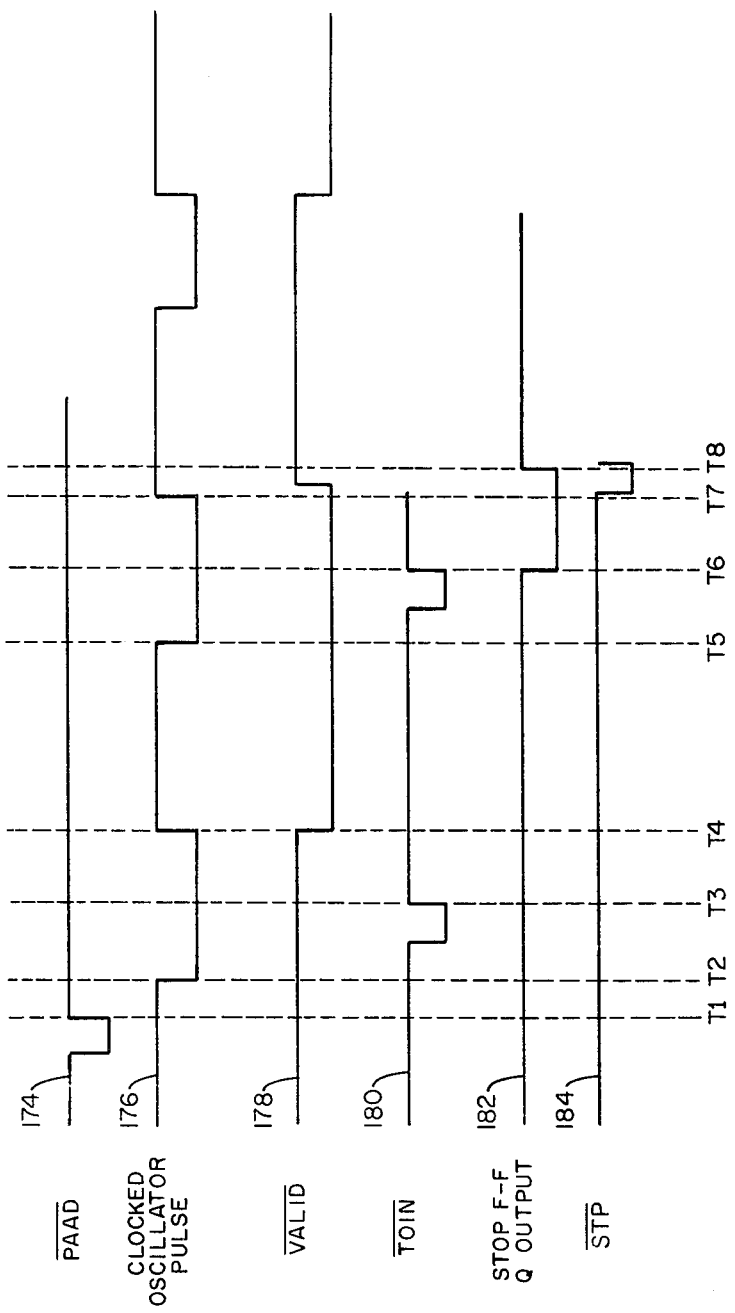
FIG. 7 is a set of timing diagrams illustrating operation of the touch circuits of FIG. 5.

With further reference to FIGS. 5 and 7, the first clock pulse after termination of the low period of the oscillator pulse, at time T4 in FIG. 7, sets the synch flip-flop 158. The rising output at its Q output terminal clocks the valid flipflop 162 to the clear state. The data inputs of flip-flops 160 and 162 are grounded, to be at the low logic level. The $\overline{VALID}$ signal at the Q output of flip-flop 162 accordingly drops from the previous high level to a low level, as waveform 178 shows at time T4. The resultant low level of the $\overline{VALID}$ signal indicates that the counter 166 contains a valid oscillator-pulse count. This low-level signal, applied to the P-EN input of the counter 166, disables the counter from responding to subsequent oscillator pulses from the synch flip-flop. FIG. 7 shows, for illustration only, one such oscillator pulse which the disabled counter does not measure as occurring between the times T5 and T7. The signal from the Q output of the valid flip-flop 162 is applied also as an input to the data-bus driver 170.

The counter 166, the stop flip-flop 160 and the valid flop-flop 162 remain in this condition until the microprocessor reads in the count signal which the counter 166 is applying to the driver 170. For this operation, the microprocessor 20′ produces a $\overline{TOIN}$ signal. This signal, shown in FIG. 7 with waveform 180, actuates the driver 170 to apply to the data bus 40′ the count from the counter 166 and the level of the $\overline{VALID}$ signal which the driver is receiving from the valid flip-flop 162. The $\overline{TOIN}$ signal also clocks a stop flip-flop 160 to switch to the clear state. In the illustrative timing sequence of FIG. 7, these operations occur in response to the trailing edge of a $\overline{TOIN}$ signal, time T6. Hence, at this time the stop flip-flop switches to the clear state, as shown with waveform 182, which shows the signal level at the Q output of the stop flip-flop 160.

The stop flip-flop 160 applies the resultant low level at the Q output to one of two inputs of an OR gate 164. The other input to the OR gate is the complement of waveform 176 and hence becomes low when the synch flip-flop 158 switches to the set state. This occurs in the illustration of FIG. 7 at the time T7. When both inputs of the OR gate 164 are thus at a low level, the gate output, which is designated an $\overline{STP}$ signal with the FIG. 7 waveform 184, assumes a low level. This signal clears the counter 166, readying it for another counting operation. The $\overline{STP}$ signal also resets the valid flip-flop 162 by way of an inverting preset input terminal 162a. The resultant low level at the $\overline{Q}$ output of that flip-flop 162 presets the stop flip-flop 160 by way of a similarly inverting preset input terminal 160a, at time T8 in the FIG. 7 example. The resultant high level signal at the $\overline{Q}$ output of the stop flip-flop 160 terminates the low level of the $\overline{STP}$ signal from the OR gate 164.

The measuring stage 172 of FIG. 5, which as described also provides synchronizing and validating functions, has now completed one pulse-counting and transmitting sequence and is ready to repeat that sequence. Note that when the microprocessor sends a $\overline{TOIN}$ signal at a time when the $\overline{VALID}$ signal is at a high level, as occurs for example at time T3 in FIG. 7, the microprocessor control signal actuates the driver to apply count and valid bits to the data bus 40′. However, the high level of the $\overline{VALID}$ bit signals the microprocessor that it is receiving invalid count information and the microprocessor, in response, disregards the information.

FIG. 5 further shows that the microprocessor 20′ develops the two control signals, i.e. $\overline{PAAD}$ and $\overline{TOIN}$, with a decoder 186 that receives address bus and control signals.

In one practice of the touch-kit embodiment shown in FIG. 5, each analog multiplexer 134, 136, 138, 140 is a type 4051 integrated circuit as marketed by National Semiconductor. The multiplexer 150 can also be a type 4051 circuit. Each oscillator 142, 144, 146, 148 is part of a 556 integrated circuit, the address latch is a type 74LS374/377 integrated circuit, each flip-flop is part of a type 74LS74 integrated circuit, the counter is a type 74LS161 integrated circuit, and the driver is a type 74LS367 circuit; this 7400 series is marketed by Motorola Semiconductor Products, Inc. and by the Signetics Company. Further, the microprocessor is a Z80 integrated circuit as marketed by Zilog Inc. and by the Mostek Company.

The add-on kit 128 of FIG. 6, and particularly the touch circuits 130 shown in FIG. 5, can operate in the manner described above with reference to the flow diagrams of FIGS. 3 and 4. Alternatively, the touch circuits 130 can operate with the microprocessor 20′ (FIG. 5) to provide updated reference information for each touch pad 14′ and to identify the touching of one pad 14′ by averaging multiple measures.

In one particular practice, the microprocessor 20′ normally addresses different pads 14′ in succession, by means of address signals sent to the address latch 154 by way of the data bus 40′. The microprocessor reads in eight successive valid counts from the counter 166 and driver 170, each in response to a $\overline{TOIN}$ signal when the $\overline{VALID}$ signal is low, as described above with reference to FIG. 7. The microprocessor rejects any invalid counts and sums the eight valid counts in an adder. It then divides the sum by eight to obtain an average of the eight valid measuring counts, and stores that information together with the pad identification. The microprocessor 20′ repeats this operation with the next addressed pad 14′ until it has obtained an average of eight measures from each of the thirty-two pads.

For the first, initial operation of the touch circuits after being turned on, the resultant of multiple repeated average measures from all the touch pads 14′ are stored, typically in specified RAM locations, for use as reference values. That is, the measures represent nominal oscillator pulse-measurements that are obtained when no pad 14′ on the screen is being touched.

During operation subsequent to the foregoing initialization, the microprocessor 20′ stores the average measure obtained from each pad and, before addressing another pad, compares that average measure with the reference value previously stored for the pad currently being addressed. When the comparison indicates that the newly-measured average value is within a selected arithmetic range of the reference value for that pad, the microprocessor determines that the addressed pad 14′ is not being touched. Conversely, when the newly-measured average value differs from the reference value by a selected margin, the microprocessor determines that the addressed pad may be being touched. The microprocessor consequently stores the pad identification as a candidate and stores the computed difference from the reference values.

When the microprocessor samples all the pads, by obtaining an average measure from each one, and no pads are identified as being touched, the microprocessor retains the set of average values just determined. The microprocessor next repeats the operation, i.e. again addresses each pad and secures an average of eight measures from it and compares the average with the stored reference value. Assuming the microprocessor again determines, on the second such scanning of all pads, that no pad is being touched, the prior set of average measures is used to update the previously-stored set of reference measures. This can be done by averaging the newly-measured set of average values with the previously-determined reference measures. In a preferred practice, however, the microprocessor retains the prior set of reference measures until a number of further measures have been secured, each when no location on the screen is being touched, and averages the sum of that multiple set of subsequent measures to secure a new set of reference measures which replaces the prior set of reference measures.

When the microprocessor identifies a pad as a candidate for being touched, in the manner described above, the set of average measures being obtained is not used for updating the reference measures. Instead, the microprocessor continues examining all pads and stores the identification of each one which is a candidate for the touched condition. The microprocessor repeats this examination of each pad three times, i.e. compares an average of eight measures from each pad on the CRT screen with the reference value for that pad, and repeats that sequence for all pads three times. When any pad is identified during any of the three sequential examinations as being a candidate for the touched condition, the microprocessor stores the address of that pad.

The microprocessor then examines all the touch pads designated as being candidates for the touch condition. One preferred illustrative method for this further analysis involves addressing each candidate pad in turn, securing an average of eight or like multiple measures from each addressed candidate pad, and determining and storing the difference between that average and the reference value for that pad. The microprocessor repeats that sequence for all the candidate pads a selected number of times, e.g. sixteen, and accumulates the difference values as determined during each sequence for each candidate pad. In the event a candidate pad produces a measure that is within the selected range of the reference value on, for example, three determinations, the microprocessor deletes that pad from the list of candidates. Upon completion of the sixteen sequences, if only a single pad remains in the list of candidates, the microprocessor selects it as the touched pad. In the event, however, that there are several pads identified as candidates, the microprocessor identifies as the touched pad the one associated with the largest sum of difference computations.

Whatever the determination, the microprocessor in a preferred manner of operation continues to address the pad identified as being touched and repeats that identification. The microprocessor terminates the identification of that pad as being touched upon measuring an oscillator period from it which is within the selected range of the reference value on a selected number of repetitive measures. The microprocessor then reverts to the normal operation of examining each pad on the screen, in turn, as discussed above.

In a preferred practice, the microprocessor delays the identification of a pad as touched for a selected, fractional-second, time. The purpose of this delay, which can vary with the touch terminal application, is to ensure that the operator has purposely touched a location on the CRT screen. The delay avoids responding to unintended or quickly-changed erroneous touches.

A further feature of touch terminal equipment according to the invention is ready identification of a faulty touch pad or a faulty pad-addressing portion of the touch circuits. A touch terminal according to the invention can detect such a fault upon failure to receive a pulse-measuring count when a pad is addressed. With reference to the embodiment of FIGS. 5, 6 and 7, in one illustrative practice the microprocessor 20' responds to the absence of a low level $\overline{\text{VALID}}$ signal as a fault associated with the addressed pad. The system further can start a timer each time it addresses a new pad, and detect as the failure condition the absence of a low level $\overline{\text{VALID}}$ signal from driver 170 at any time during the longest time normally required to secure the eight valid counts to be averaged from that one pad. When a fault of this nature is detected, the microprocessor produces an operator alarm identifying the fault. Further, it preferably desists from obtaining pulse-measuring counts from that addressed pad until the fault is cleared.

The multiple measures of oscillator pulse width, which touch-terminal equipment according to the invention provides, facilitates many advantageous features. These features include the initializing and the updating of reference measures for each tough pad, the detection of candidates for the touched condition and the selection of one such candidate as indeed touched, the repeated signalling that the identified pad is still touched, the prompt termination of that indication upon termination of the touching, and the diagnostic fault determination and reporting, all as described. These features enhance the attainment of a reliable and user-friendly display terminal.

It will thus be seen that the objects set forth above, among those made apparent from the preceding description, are efficiently attained. It will further be seen that certain changes may be made in the above constructions and in the foregoing operation without departing from the scope of the invention. It is accordingly intended that all matter contained in the above description or shown in the accompanying drawings be interpreted as illustrative rather than in a limiting sense.

One such change, without limitation on the scope of others, is that it may not be necessary to examine all touch pads before responding to a unusually high or low value relative to a reference. Rather, examination of a subset of all the touch pads within a certain geographical field on the cathode ray tube screen may be sufficient. Further, numerous of the steps set forth in the described flow charts can be performed in a variety of different manners taken in different sequence, to attain the equivalent result.

The invention has been described with particular reference to a CRT display terminal, but it is not limited in this regard. Rather, it can be used with other display terminals, another one of which is a terminal which employs a plasma display, sometimes referred to as a liquid crystal display.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is set forth in the appended claims:

1. In a display touch terminal having plural user-selectable, touch-responsive pad elements on a display screen for user communication with a data processing system, the improvement comprising
   A. means in circuit with said pad elements for producing a sequence of pulse signals with pulse signal durations responsive to the touch-selection condition of any selected pad element,
   B. pulse measuring means in circuit with said means for producing for measuring said pulse signal durations a selected multiple of times for any selected pad element,
   C. compare means in circuit with said measuring means for determining a difference in pulse signal duration between said multiple duration measures and a reference duration for said single pad element, and
   D. means for identifying a single pad element as user selected in response to a selected comparison determination from at least some of said multiple duration measures.

2. In a touch terminal according to claim 1, the further improvement
   A. comprising means for selecting, from among at least some of said multiple duration measures for each pad element, the measures having a selected extreme value, and
   B. in which said compare means determines said difference in response to said extreme-valued measures and said reference duration.

3. In a touch terminal according to claim 1 having a cathode ray tube display device and having display control means which repetitively sweep an electron beam horizontally across the cathode ray tube screen, the further improvement comprising means for restricting the identification of a single pad element as user selected only to measures of pulse signal duration during the horizontal sweep of the cathode ray tube display device.

4. In a touch terminal according to claim 1, the further improvement comprising
   A. means for storing a measure of reference duration for each pad element and in circuit with said compare means,
   B. means for determining when no pad element among a selected plurality thereof is user selected, and
   C. means for replacing in said storing means the reference duration for any pad element in response to said multiple duration measure for that pad element when no pad element on the screen is selected.

5. In a touch terminal according to claim 1, the further improvement in which said pulse measuring means includes
   clock means for producing a sequence of selectively-timed signals, and
   counter means in circuit with said pulse signal producing means and with said clock means for counting said selectively-timed clock signals for a duration responsive to said pulse signal durations.

6. In a display touch terminal having plural user-selected, touch-responsive pad elements on a display screen for user communication with a data processing system, the improvement comprising
   A. means in circuit with said pad elements for producing a sequence of pulse signals with pulse signal durations responsive to the touch-selection condition of any selected pad element,
   B. means in circuit with said producing means for measuring a first plurality of times the durations of the pulse signals responsive to the touch condition of each of said pad elements,
   C. means responsive to said measuring means for storing an identification of each pad element for which the measured pulse durations exceed a reference value for that pad element by a selected measure,
   D. means for measuring a second plurality of times the duration of the pulse signals responsive to the touch condition of each of said identified pad elements, and
   E. means in circuit with said last-named measuring means for identifying as user selected the single identified pad element for which the second plurality of measured pulse durations exceeds the reference value for that pad element by a selected measure.

7. A display touch terminal having plural user-selected, touch-responsive pad elements on a display screen for user communication with a data processing system, said terminal having the improvement comprising
   A. means in circuit with said pad elements for producing a sequence of pulse signals with pulse signal durations responsive to the touch selection condition of any single pad element,
   B. means connected for receiving said pulse signals for repetitively measuring said pulse signal durations a first plurality of times for the same single addressed pad element,
   C. means connected for receiving said duration measures for selecting, from among each of said first plurality of duration measures for a single pad element, the one measure having a selected extreme value,
   D. means responsive to said measuring means for storing an identification of a pad element for which said repetitive number of said extreme-valued duration measures exceeds a selected measure relative to a reference duration for that same pad element,
   E. means for providing a measurement of said pulse signal durations a second plurality of times for each identified pad element and for selecting, from among said second plurality of duration measures for each identified pad element, the one measure having a selected extreme value, and
   F. means for identifying an addressed pad element as being user selected in response to said latter selection.

8. Touch terminal apparatus for use with a display device for identifying which location on a display screen a user touches, said apparatus having user-selectable, touch-responsive pad elements on the screen and further comprising
   A. address means for addressing any pad element,
   B. means in circuit with said pad elements for producing a sequence of pulse signals with pulse signal durations responsive to the touch selection condition of any addressed pad element, C. pulse-measuring means responsive to said pulse signals for measuring said pulse signal durations a selected multiple of times for the same addressed pad element, D. compare means responsive to said measured durations for determining a difference in pulse duration between said multiple duration measures for an addressed pad element and a reference duration for said addressed pad element, and E. means for identifying a pad element as user selected in response to a comparison measure for that pad element in excess of a selected measure by more than the corresponding measure for any other pad element.

9. Touch terminal apparatus according to claim 8, further comprising

A. means for storing information identifying a pulse-signal reference duration for each pad element and in circuit with said compare means, B. means for determining the absence of a reference-exceeding comparison measure for any pad element among at least a selected portion of all the pad elements on the display screen, and C. means in circuit with said storing means and responsive to said absence-determining means for selectively replacing a stored reference duration for an addressed pad element with a measure identified by said multiple duration measures for that addressed pad element in response to said absence determination.

10. Touch terminal apparatus for use with a display device for identifying the location on a display screen which a user touches and having user-selectable, touch-responsive pad elements on the screen, said apparatus further comprising A. means in circuit with said pad elements for producing pulse signals with pulse signal durations responsive to the touch-selection condition of any pad element, B. pulse measuring means responsive to said pulse signals for measuring said pulse signal durations for any pad element, C. means for storing a measure of a reference duration for each pad element, D. means connected with said measuring means and said storing means for identifying a pad element as user selected in response to a selected comparison between said duration measure and a reference duration for said pad element, E. means for selectively replacing in said storing means the reference duration for any pad element in response to said duration measure for that pad element, and F. means for disabling the reference replacement when any pad element is identified as being touched.

* * * * *